United States Patent [19]
Urbach

[11] Patent Number: 5,531,534
[45] Date of Patent: Jul. 2, 1996

[54] PROTECTIVE COVER FOR A BALL JOINT ASSEMBLY

[75] Inventor: Brian A. Urbach, Rochester Hills, Mich.

[73] Assignee: TRW Inc., Lyndhurst, Ohio

[21] Appl. No.: 264,595

[22] Filed: Jun. 23, 1994

[51] Int. Cl.$^6$ .................................................. B65D 59/00
[52] U.S. Cl. .......................... 403/12; 403/23; 403/134; 403/315; 277/212 FB
[58] Field of Search .................. 277/212 FB, 212 R; 403/11, 12, 23, 51, 2, 134, 122, 119, 315; 411/377, 374, 373, 372, 431, 429, 432

[56] References Cited

U.S. PATENT DOCUMENTS

| | | | |
|---|---|---|---|
| 1,368,723 | 2/1921 | Helvig | 411/372 X |
| 3,007,720 | 11/1961 | Breitenstein | 403/122 X |
| 3,104,681 | 9/1963 | Gray, Jr. | 138/96 R |
| 3,199,902 | 8/1965 | Fierstine | 403/12 |
| 3,596,915 | 8/1971 | Snidar | 403/122 X |
| 3,598,434 | 8/1971 | Patton et al. | 403/11 |
| 4,415,825 | 11/1983 | Dailey et al. | 403/23 X |
| 4,552,480 | 11/1985 | McIntyre | 403/134 X |
| 4,610,559 | 9/1986 | Mayhew et al. | 403/23 |
| 4,639,159 | 1/1987 | Amrath | 403/51 X |
| 4,750,878 | 6/1988 | Nix et al. | 411/377 X |
| 4,848,950 | 7/1989 | Haberstroh | 403/12 |
| 4,884,467 | 12/1989 | Martell | 403/51 X |

FOREIGN PATENT DOCUMENTS

| | | | |
|---|---|---|---|
| 1196434 | 7/1965 | Germany | 403/122 |
| 636531 | 3/1962 | Italy | 411/377 |
| 2100337 | 12/1982 | United Kingdom | 403/122 |

*Primary Examiner*—Dave W. Arola
*Assistant Examiner*—Christopher J. Novosad
*Attorney, Agent, or Firm*—Tarolli, Sundheim, Covell, Tummino & Szabo

[57] ABSTRACT

A protective cover 12 for a threaded stud 26 of a ball joint 10 includes retaining members 90 for engaging the stud 26 of the ball joint 10. The retaining members 90 apply a retaining force to the stud 26 to prevent removal of the cover 12 from the ball joint 10. A wall 72 of the cover 12 includes a weakened portion 96. The weakened portion 96 of the wall 72 breaks in response to shear forces applied to the cover 12 which lessens the force applied by the retaining members 90 to the stud 26. Therefore, the cover 12 can be easily removed from the ball joint 10.

9 Claims, 1 Drawing Sheet

PROTECTIVE COVER FOR A BALL JOINT ASSEMBLY

BACKGROUND OF THE INVENTION

The present invention relates to a protective cover for a threaded stud, and more particularly relates to a protective cover for a threaded stud of a ball joint.

Ball joints are usually exposed to extensive handling after manufacture. For example, many ball joints are commonly manufactured at one location and shipped to another location for installation in a vehicle. In a typical example, a ball joint is assembled into a suspension control arm. The suspension control arm with the ball joint is then installed in a vehicle. U.S. Pat. No. 3,598,434 discloses a cover which may be used to protect the ball joint, especially the threaded stud, prior to and during assembly into the control arm and during subsequent handling. The cover is removed preferably immediately prior to installation of the control arm into a vehicle. However, the cover may fall off of the ball joint during handling of the ball joint.

U.S. Pat. No. 4,848,950 discloses a cover for a ball joint that has retaining members engaging a threaded stud of the ball joint. The retaining members engage the threaded stud with a retaining force which makes it difficult to remove the cover from the ball joint when the control arm is to be installed into a vehicle.

SUMMARY OF THE INVENTION

An improved protective cover for a ball joint includes a structure for maintaining the cover on the ball joint during handling of the ball joint and for permitting easy removal of the protective cover at the appropriate time.

The improved protective cover includes a generally cylindrical wall which encloses a threaded stud of the ball joint. Retaining members extend radially inward from the wall and apply a retaining force to the stud to prevent removal of the cover from the ball joint. The wall includes an axially extending groove which defines a weakened portion of the wall. Upon axial movement of the cover relative to the stud to remove the cover from the ball joint, the wall breaks along the groove. Upon breaking of the wall, the retaining members apply a small force against the stud to permit easy removal of the cover from the ball joint.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 2:
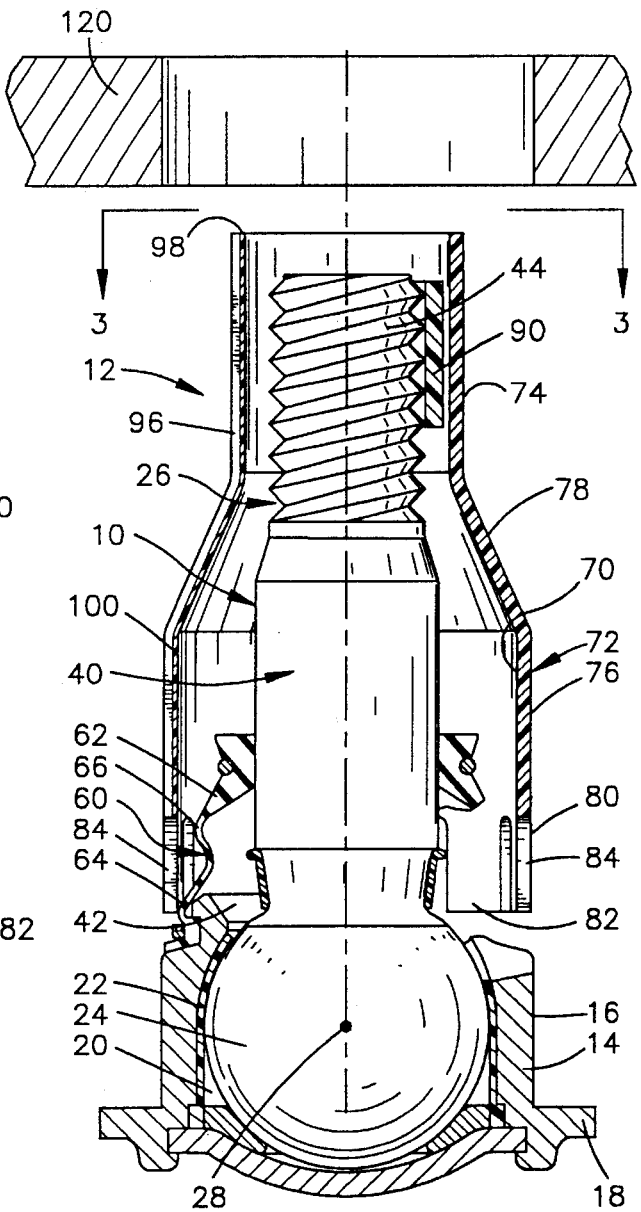
FIG. 2 is a view, partially in section, of a ball joint enclosed by the protective cover of FIG. 1.

A ball joint assembly 10 (FIG. 2) is at least partially enclosed by a protective cover 12 constructed in accordance with the present invention. The ball joint assembly 10 includes a rigid metal socket 14 (housing) having a generally cylindrical wall 16 and a mounting flange 18. The socket 14 defines a socket chamber 20 within which is located a bearing 22. Preferably, the bearing 22 comprises two injection molded plastic pieces. However, the bearing 22 is illustrated in FIG. 2 as one piece.

The bearing 22 supports a spherical ball portion 24 of a ball stud 26. The bearing 22 supports the ball stud 26 for limited rotation and pivoting movement about a center of oscillation 28. The center of oscillation 28 is coincident with the center of the spherical ball portion 24 of the ball stud 26.

A shank portion 40 of the ball stud 26 projects through a circular opening 42 in the socket 14. A flexible boot seal member 60 seals the opening 42 between the ball stud 26 and the socket 14. The seal member 60 includes a shank seal portion 62 which encircles and seals against the shank portion 40 of the ball stud 26 and a socket seal portion 64 which encircles and seals against the socket 14. The shank seal portion 62 and the socket seal portion 64 are interconnected by a connector portion 66. The seal member 60 has a passage through which the ball stud shank portion 40 extends. The seal member 60 is formed of a suitable synthetic rubber or polymeric material.

Figure 1:
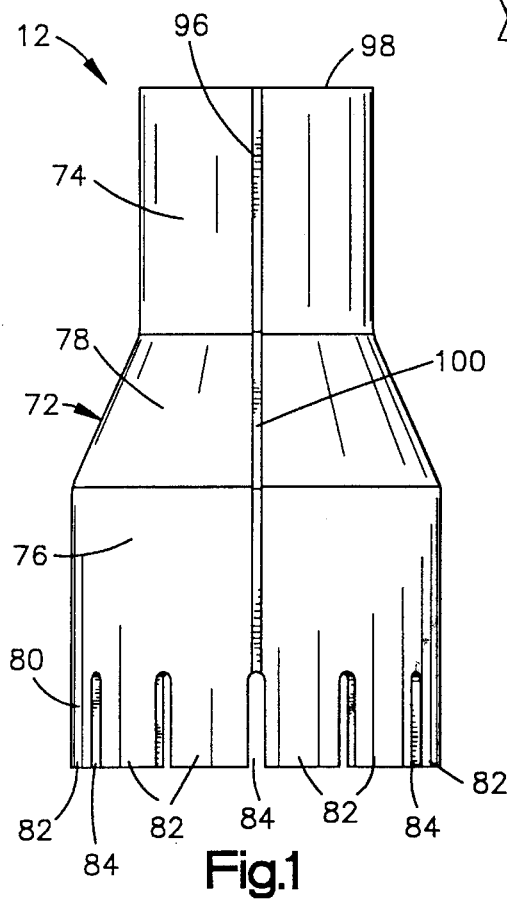
FIG. 1 is a side elevational view of a protective ball joint cover embodying the present invention.

The protective cover 12 (FIGS. 1 and 2) is one-piece and made of a suitable plastic or other material, preferably polyethylene. The protective cover 12 has a generally cylindrical chamber 70 (FIG. 2) which receives the shank portion 40 of the ball stud 26 and the seal member 60. The protective cover 12 encloses the shank portion 40 of the ball stud 26 and the seal member 60 to protect them during handling.

The protective cover 12 (FIGS. 1 and 2) includes a wall 72. The wall 72 has a cylindrical upper end portion 74, as viewed in FIG. 1, and a somewhat larger diameter cylindrical lower end portion 76. The upper and lower end portions 74 and 76 are interconnected by a frustoconical intermediate connector section 78.

A generally cylindrical skirt section 80 extends axially downward (as viewed in FIG. 1) from the lower end portion 76 of the wall 72. The skirt section 80 includes a plurality of segments 82 which are separated by axially extending slots 84. The skirt segments 82 are easily deflected radially outward by engagement with the socket 14.

Figure 3:
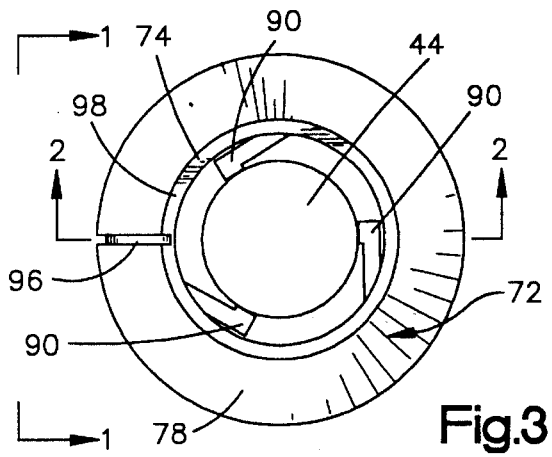
FIG. 3 is an end view of the structure of FIG. 2 taken along the line 3—3 of FIG. 2.

A plurality of retaining members 90 (FIGS. 2 and 3) extend axially along the upper portion 74 and radially inward from the upper portion into engagement with a threaded end portion 44 of the ball stud 26. Preferably, there are three retaining members 90. The retaining members 90 apply a retaining force to the ball stud 26 to hold the protective cover 12 against axial movement relative to the shank portion 40 until it is desired to remove the cover.

The wall 72 (FIGS. 1 and 2) includes an axially extending groove 96 that defines a weakened portion of the wall 72. The wall 72 breaks along the groove 96 upon the application of an axial force to the cover 12 to move the cover 12 and remove the cover from the ball joint assembly 10. The groove 96 extends from an axial end portion 98 of the wall 72 to a slot 84 in the skirt section 80. The groove 96 has a radially inner wall 100 with a thickness measured in the radial direction. The thickness of the wall 100 is smaller than the thickness of the rest of the wall 72, as seen in FIG. 2.

After the ball joint assembly 10 has been fabricated, it is aligned with the cylindrical chamber 70 of the protective cover 12. Then the protective cover 12 is telescoped over the shank portion 40 of the ball stud 26 and seal member 60 until the skirt portion 80 engages the seal member 60. Upon movement of the cover 12 relative to the shank portion 40, the retaining members 90 transmit radial forces to the wall 72. The radial forces do not cause the wall 72 to break along the groove 96. The protective cover 12 then encloses the shank portion 40 of the ball stud 26 and the seal member 60. The retaining members 90 of the protective cover 12 apply a retaining force to the threaded outer end portion 44 of the ball stud 26. The ball joint 10 is encircled by the protective cover 12 and is protected from damage during handling and shipping.

The ball joint assembly 10 encircled by the protective cover 12 is assembled onto a control arm 120. The protective cover 12 and the ball joint assembly 10 are telescoped through a hole in the control arm 120 until the mounting flange 18 of the ball joint assembly 10 abuts the control arm 120. The cover 12 is moved axially relative to the ball joint 10 toward the control arm 120. During this movement the skirt segments 82 engage the housing 14 and deflect radially outward, as is known in the art. The cover 12 provides good protection of the shank portion 40 and the seal 60 until the control arm 120 is to be assembled into a vehicle.

When the control arm 120 is to be assembled with a vehicle, an axial force is applied to the protective cover 12 to move the cover axially upward, as viewed in FIG. 2. The retaining members 90 which engage the shank portion 40 resist upward movement of the wall 72. Two of the retaining members 90 are located on circumferentially opposite sides of groove 96. The resistance by the retaining members 90 results in shear forces being transmitted to the wall 72. The wall 72 breaks or tears along the groove 96 due to the shear forces. Upon breaking of the wall 72 (tears) along the groove 96, the retaining members 90 apply a relatively small retaining force to the ball stud 26. Thus, the cover 12 can easily be removed from the ball joint assembly 10.

From the above description of the invention, those skilled in the art will perceive improvements, changes and modifications. Such improvements, changes and modifications within the skill of the art are intended to be covered by the appended claims.

Having described the invention, the following is claimed:

1. A protective cover for a ball joint assembly having a socket with a ball stud and a seal between the socket and the ball stud, said cover comprising:

a generally cylindrical wall for enclosing the stud, said wall having an axially extending weakened portion, said weakened portion breaking in response to shear forces applied to said wall;

means for causing said weakened portion to break prior to any other portion of said wall in response to axial force applied to said wall; and radially inwardly extending retaining means on said wall for applying a first retaining force to the stud and preventing removal of said cover from the ball joint assembly, said retaining means applying a second retaining force to the stud smaller than the first retaining force in response to breaking of said weakened portion to permit removal of said cover from the ball joint assembly.

2. A protective cover as set forth in claim 1 wherein said retaining means includes said means for causing said weakened portion to break in response to axial force applied to said wall.

3. A protective cover as set forth in claim 2 wherein said retaining means comprises a plurality of axially and radially extending retaining members, said plurality of members extending from said wall into engagement with the stud.

4. An apparatus comprising:

a socket;

a ball stud having a shank portion extending from said socket;

a seal between said shank portion and said socket; and a protective cover comprising a wall defining a chamber for receiving said shank portion and said seal, said cover having retaining means for applying a force to said shank portion and preventing removal of said cover, said wall having surface means defining a groove, said wall breaking along said groove to lessen the force applied to said shank portion by said retaining means upon application of an axial force to said cover to move said cover relative to said shank portion.

5. An apparatus as set forth in claim 4 wherein said groove extends axially along said wall, said retaining means including a plurality of axially and radially extending members, said members including means for causing said wall to break along said groove in response to application of said axial force to said cover.

6. A protective cover for a ball joint assembly having a socket with a ball stud and a seal between the socket and the ball stud, said cover comprising:

a generally cylindrical wall for enclosing the stud, said wall having an axially extending weakened portion, said weakened portion breaking in response to shear forces applied to said wall, said wall having a first thickness measured in a radial direction, said weakened portion of said wall having a radially inner wall with a second thickness less than the first thickness; and radially inwardly extending retaining means on said wall for applying a first retaining force to the stud and preventing removal of said cover from the ball joint assembly, said retaining means applying a second retaining force to the stud smaller than the first retaining force in response to breaking of said weakened portion to permit removal of said cover from the ball joint assembly.

7. A protective cover as set forth in claim 6 wherein said weakened portion defines an axially extending groove in said wall.

8. A protective cover as set forth in claim 7 wherein said axially extending groove extends from one axial end of said wall to another axial end portion of said wall.

9. A protective cover as set forth in claim 8 wherein said wall includes a skirt portion radially expandable in response to engagement with the socket, said skirt portion including a plurality of skirt segments separated by axially extending slots, said groove extending from said one axial end portion to one of said axially extending slots.

* * * * *